US008065967B2

(12) United States Patent
Wong

(10) Patent No.: US 8,065,967 B2
(45) Date of Patent: Nov. 29, 2011

(54) MODULAR WELDING TABLE

(76) Inventor: Harry Wong, South Pasadena, CA (US)

( * ) Notice: Subject to any disclaimer, the term of this patent is extended or adjusted under 35 U.S.C. 154(b) by 441 days.

(21) Appl. No.: 12/436,287

(22) Filed: May 6, 2009

(65) Prior Publication Data

US 2010/0282133 A1 Nov. 11, 2010

(51) Int. Cl.
*B23Q 3/02* (2006.01)

(52) U.S. Cl. ........ 108/181; 108/155; 269/136; 269/138; 144/287

(58) Field of Classification Search .......... 269/136–138, 269/16, 289 R; 144/287, 286.5, 286.1; 108/90, 108/93, 50.11, 181, 187, 185, 27, 67, 101, 108/155

See application file for complete search history.

(56) References Cited

U.S. PATENT DOCUMENTS

| | | | | |
|---|---|---|---|---|
| 869,461 A * | 10/1907 | Rosebaum | | 108/30 |
| 2,469,151 A * | 5/1949 | Bremer | | 269/16 |
| 2,556,611 A * | 6/1951 | Borgman | | 182/186.6 |
| 2,888,305 A * | 5/1959 | Perry | | 108/65 |
| 4,073,484 A * | 2/1978 | Beekenkamp | | 269/329 |
| 4,161,974 A * | 7/1979 | Patterson | | 144/287 |
| 4,231,557 A * | 11/1980 | Blachly et al. | | 269/139 |
| 4,353,140 A * | 10/1982 | Graber | | 5/505.1 |
| 4,665,838 A * | 5/1987 | Minshall | | 108/186 |
| 4,730,732 A * | 3/1988 | Wagonseller | | 206/597 |
| 5,115,847 A * | 5/1992 | Taber | | 144/287 |
| 5,284,331 A * | 2/1994 | Lee et al. | | 269/16 |
| 5,451,028 A * | 9/1995 | Lietti | | 248/676 |
| 6,089,555 A * | 7/2000 | Lin | | 269/139 |
| 6,149,145 A * | 11/2000 | Lin | | 269/139 |
| 6,371,495 B2 * | 4/2002 | Thompson | | 280/30 |
| 2004/0140412 A1 * | 7/2004 | Hendzel et al. | | 248/440 |

* cited by examiner

*Primary Examiner* — Janet M Wilkens
(74) *Attorney, Agent, or Firm* — Jen-Feng Lee, Esq.

(57) ABSTRACT

A modular welding table where the work surface is made up of a plurality of plates that can be easily slid to and fro, adapting to objects of different shapes is disclosed. The through holes on these plates, as well as the parallel grooves between these plates, provide the foothold for clamping tools and devices that are used in conjunction to this welding table, to secure the work piece in place. Under each of the leg, a height-adjustable pad is provided, so that the welding table can adjust its evenness accordingly, by turning the screw stem of the pad easily.

4 Claims, 4 Drawing Sheets

MODULAR WELDING TABLE

FIELD AND BACKGROUND OF PRESENT INVENTION

Welding platens and welding tables are commonly used in the machining industry. They provide an ideal surface for precision work to be conducted on work pieces that can be easily secured on the welding table.

However, these types of welding tables either do not have the capability for the conjunctive of other clamping or holding tools, or that they do not have the adaptability to change the working surface when the work objects are of varied shapes and dimensions.

Present invention provides a unique design of modular welding tables, so that it is versatile, easy for conjunctive use with other holding and clamping tools and can adapt to different work objects.

OBJECT AND SUMMARY OF THE PRESENT INVENTION

Present invention provides a unique design of modular welding tables, so that the surface of the welding tables can be easily re-shaped to accommodate objects of different sizes, making it versatile and easy for conjunctive use with other holding and clamping tools and can adapt to different work objects.

To re-shape the surface area, it is achieved by sliding the plurality of plates along the width direction of the welding table. Each of the plate has matching holes that can be screwed down into the holes on the seats just below the plate.

On these plates, there are through-holes that are evenly distributed across the surface (in addition to the matching holes). Depending on the shape of the work pieces, and depending on other clamping tools that can be used in conjunction with the welding table of present invention, these through-holes provide the mechanism where clamping tools or devices can latch on to the table, providing the anchor force for gripping onto and securing the work pieces on the welding table.

The parallel grooves in between plates, in addition to the through-holes, provide a foothold for the clamping tools or device to latch on and secure the work pieces to the welding table.

DETAILED DESCRIPTION OF THE PREFERRED EMBODIMENT

Figure 1:
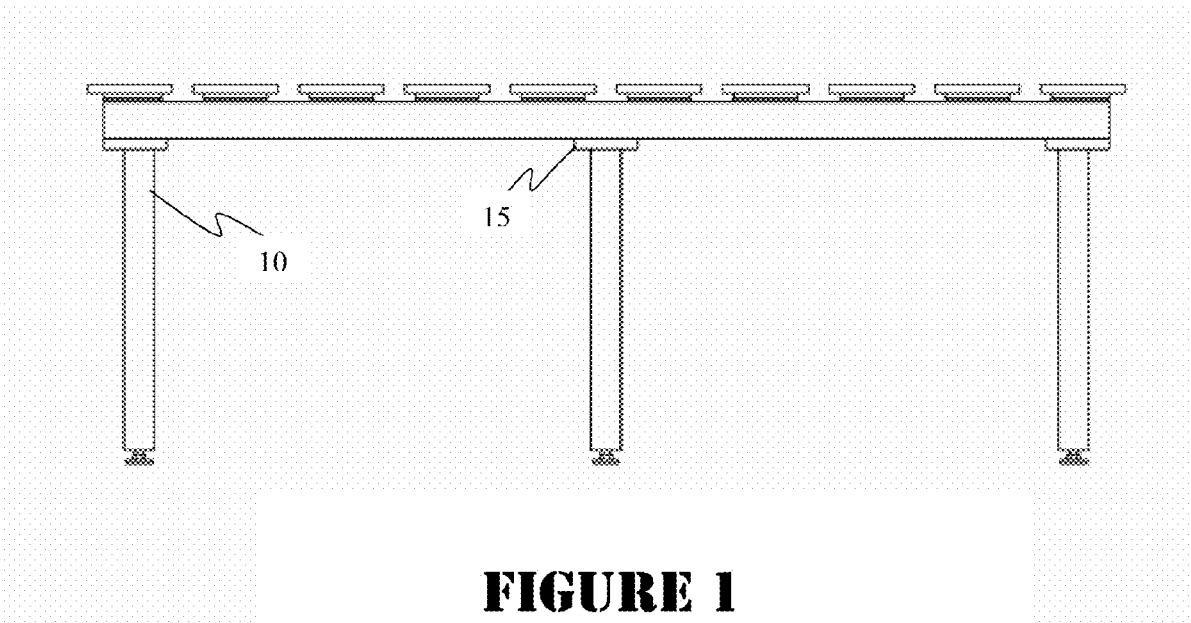
FIG. 1 is the front view of the welding table in present invention.
Figure 2:
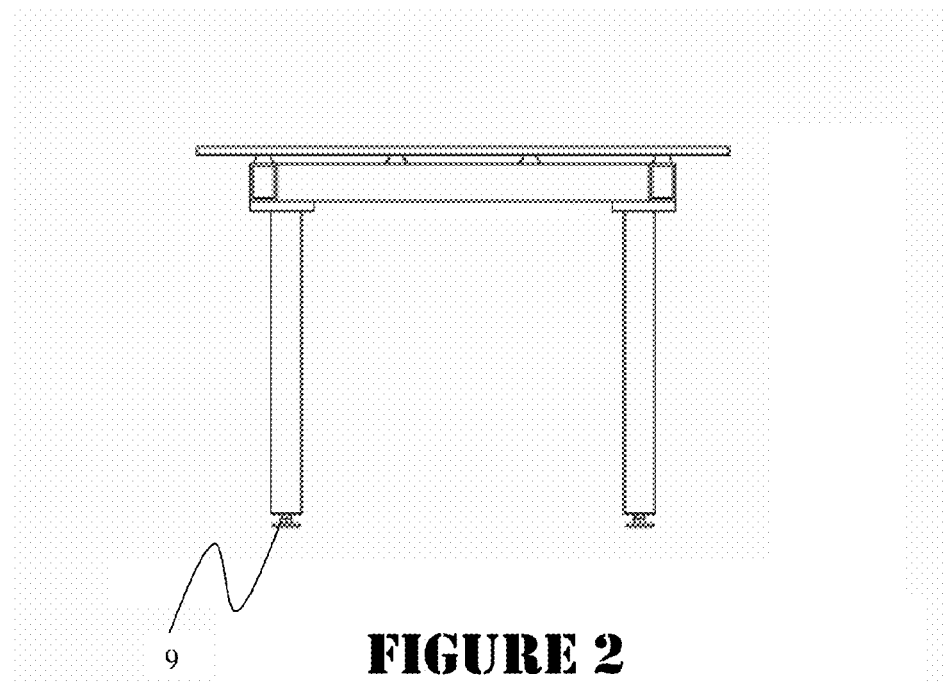
FIG. 2 is the side view of the welding table in present invention.
Figure 3:
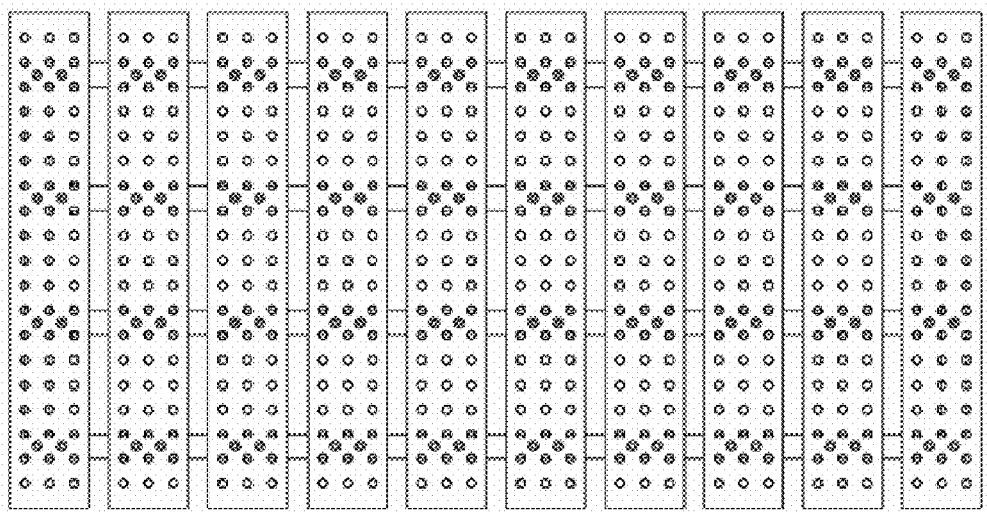
FIG. 3 shows the top-down view of the welding table in present invention.

Referring to FIGS. 1-2, a welding table 1 is depicted where a plurality of legs 10 are situated at four corners of welding table 1 to support the table surface. Optionally, an additional pair of legs 10 may be in place in the longitudinal direction, depending on implementation, as shown in FIG. 1.

The welding table surface is made up by a plurality of bars 20 which are evenly spaced out across the width direction of the surface. The length direction of these bars 20 go along with the length direction of the welding table 1.

On top of every pair of legs 10, there is a connector piece 15, so that the two sidemost bars 20 sit on top of these connector pieces 15. A horizontal bar 18 connects each pair of connector pieces 15. So that if there are four legs 10, only two horizontal bars 18 are used to connect the four connector pieces 15; and if there are six legs, there will be three horizontal bars 18.

Under each leg 10, a height-adjustable pad 9 is attached, allowing some fine adjustment of length by screwing/turning each pad 9. Each of said pad 9 has a central screw stem going upward, into the bottom of leg 10.

On the top surface of each of the bar 20, there are a plurality of seat 22 that are evenly spaced out along the length direction of the welding table 1, which is also the length direction of each of the bar 20.

On the transverse (width) direction of the welding table 1, there is a plurality of plates 42, the width of each of the plate 42 is sized to cover the seats 22 when placed over the seats, and length of each of the plate 42 is sized to fit the width of the welding table 1.

The top surface of the welding table 1 will consist of plates 42, which will be referred to as surface plates 42, when they appear on the surface.

Also, the width of each of the plate 42 is sized to fit into the gap between every two bars, for purpose of the additional plate 42 storage, stated below.

Figure 4:
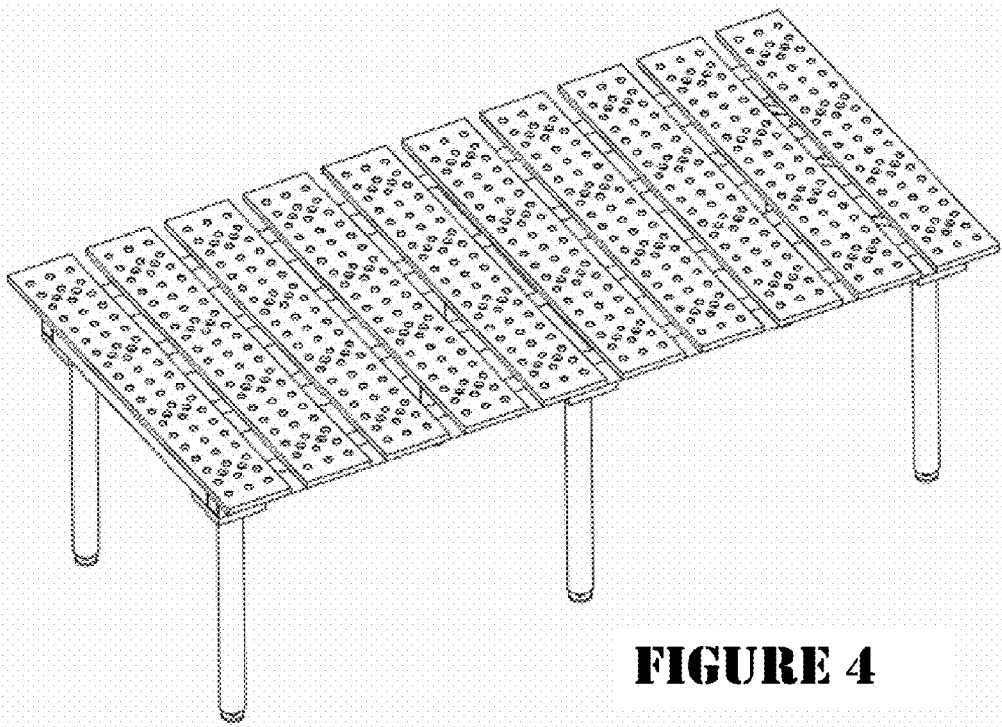
FIG. 4 shows the perspective 3-dimensional view of the welding table in present invention.
Figure 5:
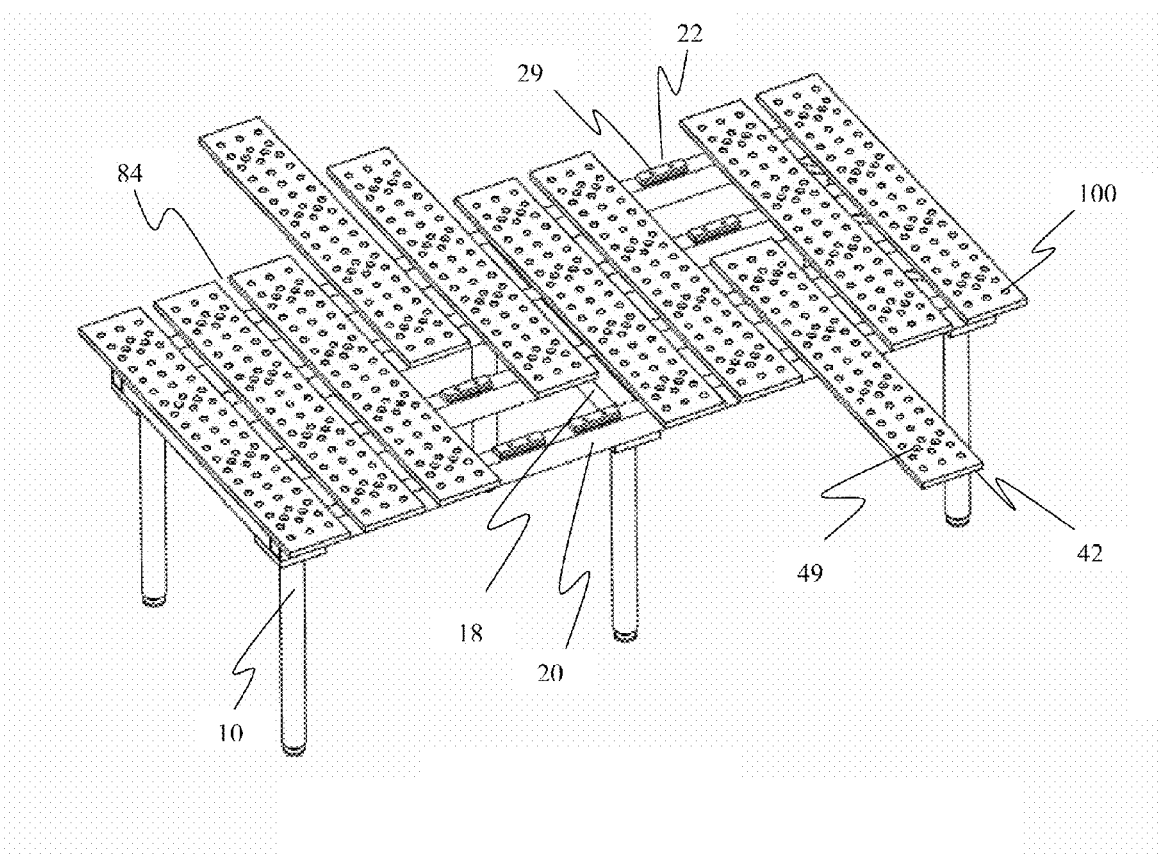
FIG. 5 shows the changing configuration of the welding table in present invention.

Surface plates 42 are evenly spaced out from one another along the length direction of welding table 1, as shown in FIGS. 4 and 5. Plates 42 have holes for insertion of objects or other external tools.

Each seat 22 has at least one hole 29 facing upward, preferably with threadlines for screws. Each plate 42 further has matching holes 49 over the holes 29 on the seat 22, so that each plate 42 can be fixed in a different position as user desires, as shown in FIG. 5.

Other than matching holes 49 (for matching to holes 29 on seat 22), each plate 42 has a plurality of evenly distributed through-holes 100, allowing work pieces to be secured or fastened by other clamping piece used in conjunction with the welding table 1 of present invention.

The matching holes 49 on the plate 42 are made in a way that each plate 42 can be shifted around the width direction of the welding table 1, and be securely fastened to the seat 22 below it, as shown in FIG. 5, while exposing some seats 22.

The plates 42 are arranged in a parallel fashion, as are the grooves 84 in between them, so that these grooves 84 also form an anchor position for clamping tools or devices to gain a foothold for gripping and securing work pieces.

Seats 22 have thickness greater than that of plates 42, so that additional plates 42 can be stored under the surface plates, between the gaps created by bars 20. When additional plate 42 is stored in this manner, it sits on top of the horizontal bars 18 and can be slideably pulled out, as shown in FIG. 6, from the gap between bars 20.

Figure 6:
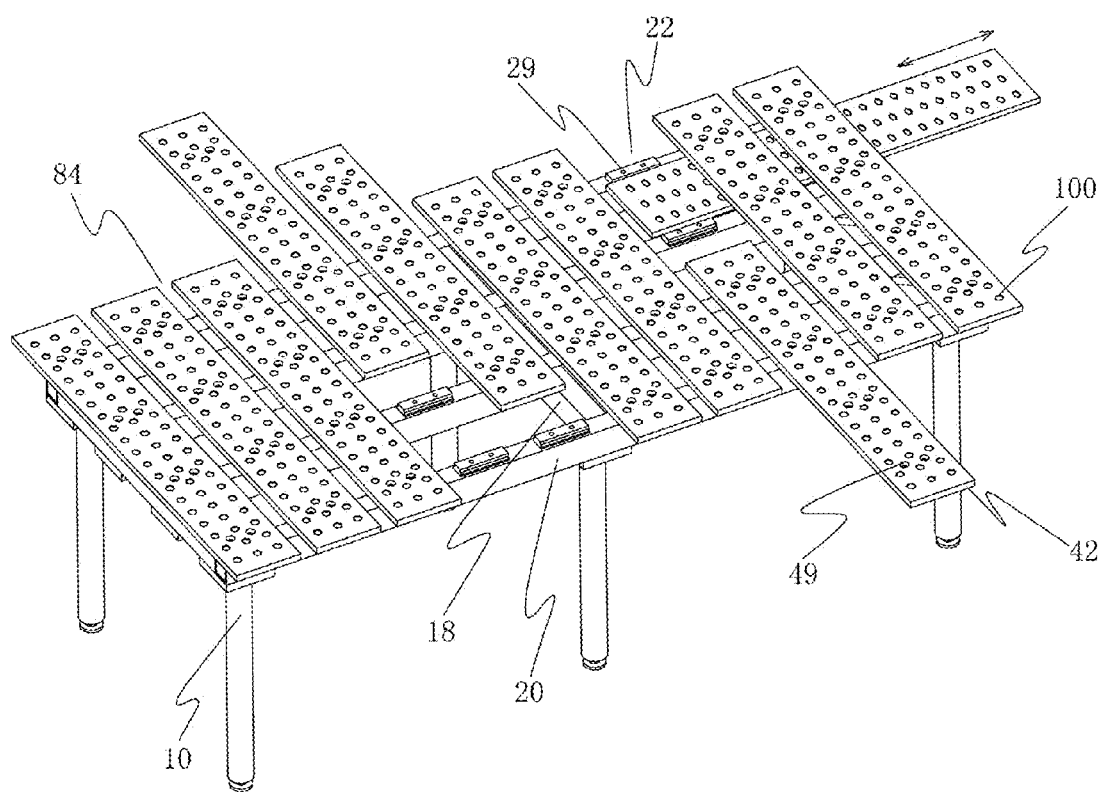
FIG. 6 shows the flexibility of additional plates being stored under the surface plates.

Moreover, these additional plates 42 can be used to connect more than one welding table when they are extending out from under the surface plates, as shown in FIG. 6, and another welding table (not shown in FIG. 6) can be joined by screwing together (or other commonly available means) the surface plates 42 to these additional plates.

What is claimed is:

1. A modular welding table, comprising:

A plurality of legs having connector pieces on top of said legs and every two of said connector pieces are connected by a horizontal bar;

A plurality of bars evenly spaced out across the length of said horizontal bar and across the width of said welding table;

A plurality of seats evenly spaced out along the length of each of said bars, each of said seat has at least one hole facing up; and, A plurality of plates having matching holes to the seat's holes, said plates are arranged in a parallel fashion, creating in-between grooves in similar parallel fashion and having width to fit the gaps in between the bars.

2. The modular welding table of claim 1, wherein the plates have, in addition to the matching holes for the seat's holes, a plurality of through-holes that are evenly distributed over the surface of said plate, for securing or fastening work pieces in conjunction with other tools are also used.

3. The modular welding table of claim 1, wherein the seats have greater thickness than the thickness of the plates, allowing additional plates to be stored in the gaps between bars and sitting on top of the horizontal bars.

4. The modular welding table of claim 1, wherein a height-adjustable pad is at the bottom of each leg, so that the actual height of each leg can be varied by screwing/turning each pad that has a central screw stem going upwards.

* * * * *